United States Patent [19]
Spirig

[11] 3,957,618
[45] May 18, 1976

[54] WATER DECOMPOSITION APPARATUS FOR PRODUCING DETONATING GAS

[76] Inventor: Ernst Spirig, Movenstrasse 37, Rapperswil, Switzerland

[22] Filed: Aug. 7, 1974

[21] Appl. No.: 495,310

[30] Foreign Application Priority Data
Aug. 22, 1973 Switzerland.................. 12090/73

[52] U.S. Cl................. 204/270; 204/129; 204/229; 204/268; 204/269; 204/272
[51] Int. Cl.² ............... C25B 1/02; C25B 1/04
[58] Field of Search ........... 204/129, 267, 268, 269, 204/270, 272, 229

[56] References Cited
UNITED STATES PATENTS

| | | |
|---|---|---|
| 906,669 | 12/1908 | Vogelsang.................... 204/268 |
| 3,451,906 | 6/1969 | Weed............................ 204/269 X |
| 3,616,436 | 10/1971 | Haas............................. 204/229 |
| 3,692,661 | 9/1972 | Shockcor....................... 204/269 |
| 3,824,172 | 7/1974 | Hodges......................... 204/270 X |

Primary Examiner—T. Tung
Assistant Examiner—A. C. Prescott

[57] ABSTRACT

A water decomposition apparatus for producing detonating gas or oxyhydrogen gas comprising a number of successively bounding electrolysis cells. These cells are arranged within a common compartment and constructed as vessels open at the top and equipped with openings or mouths which are located at different elevational positions. Each cell opens into the next bounding lower situated cell. The cell having the highest located mouth flow communicates via an opening at its floor with the lower portion of the common compartment.

3 Claims, 6 Drawing Figures

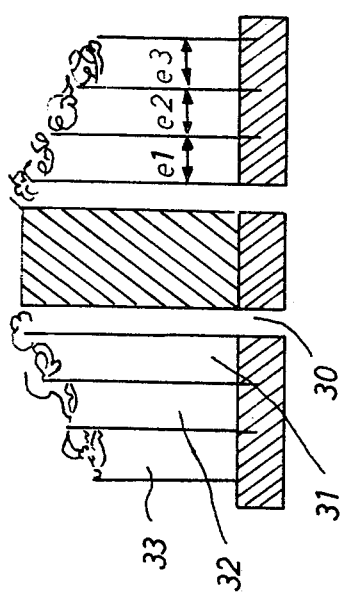
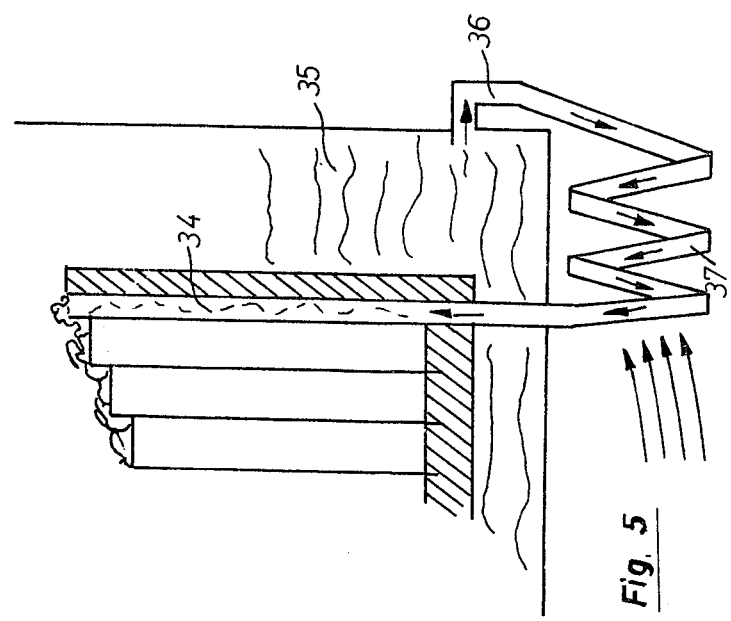
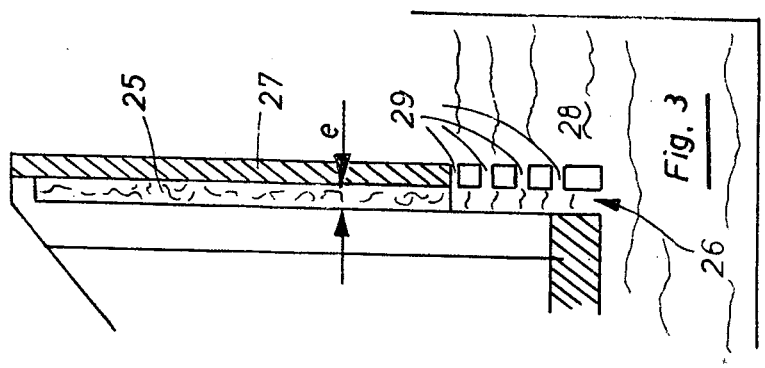

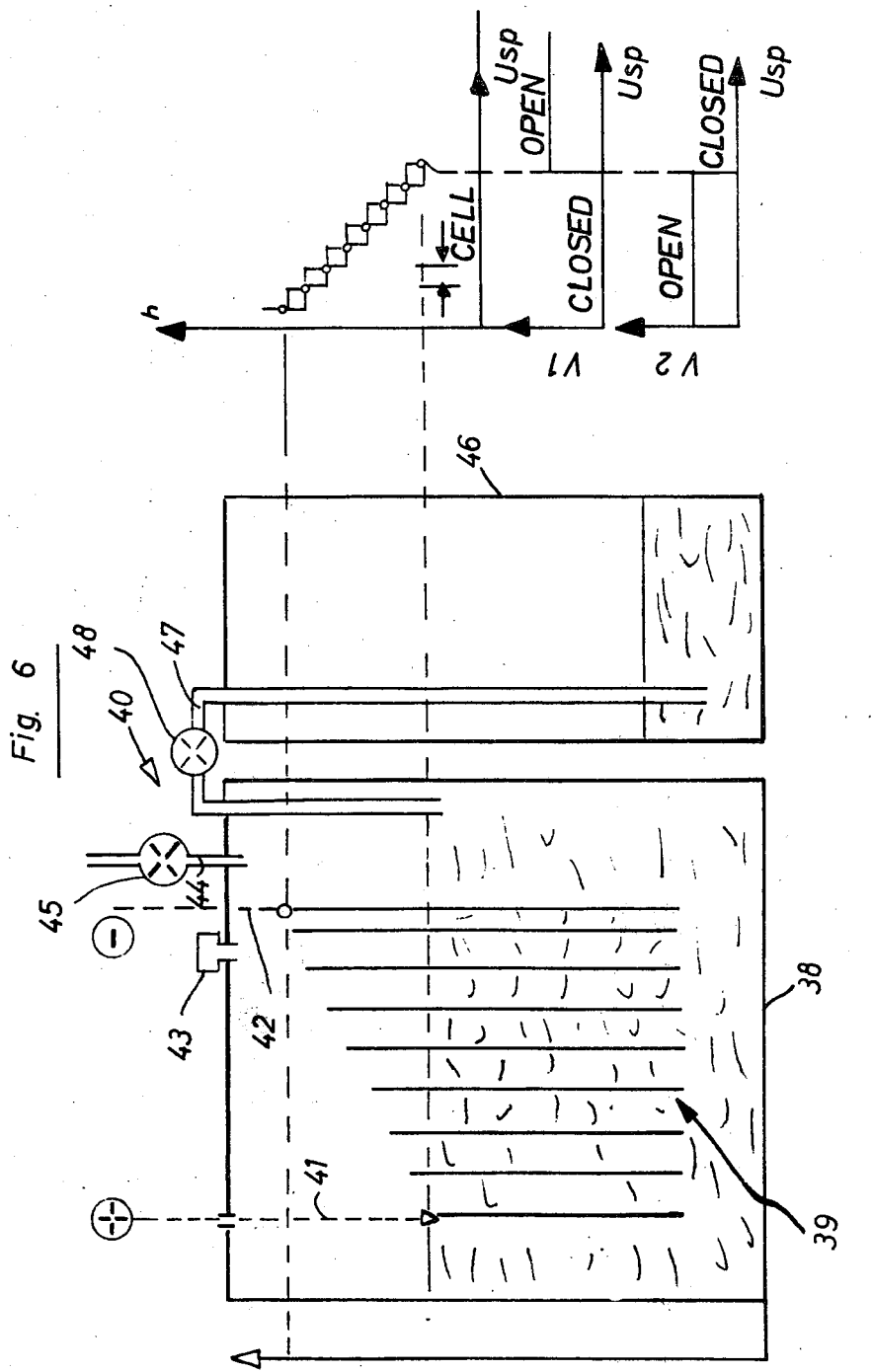

WATER DECOMPOSITION APPARATUS FOR PRODUCING DETONATING GAS

BACKGROUND OF THE INVENTION

The present invention relates to a new and improved construction of water decomposition apparatus for producing detonating gas or oxyhydrogen gas, hereinafter simply referred to as detonating gas, and is of the type incoporating a number of successively bounding electrolysis cells, i.e. an electrolysis apparatus for producing detonating gas.

The technology which is available at the present time has proposed a great number of electrolysis installations which, however, are all generally constructed as large-scale electrolysis installations. These installations are designed as so-called multi-cell installations requiring a much greater technical expenditure. As part of these installations there is usually provided leaching pumps, separation vessels for the electrolytic foam and additionally long pipe conduits for each electrolysis or electrolytic cell in order to be able to maintain the stray currents small. Such installations are complicated, heavy and expensive.

There are also known to the art smaller installations for the production of detonating gas and which are portable, simple in construction and relatively inexpensive. However, up to the present time such equipment has been designed as single-cell devices. There are required high currents, and hence, at the conventionally employed rectifiers there are present high thermal losses since the electrolysis voltage approximately corresponds to the rectifier voltage. However, owing to the high currents there is limited the quantitative production of the gas at the single-cell equipment.

In order to be able to also realize in this case greater output there also had to be made available multi-cell equipment since for constant current the generated quantity of gas is increased by the multiple of the number of cells.

As has already been explained above such multi-cell installations however require an extremely great technological expenditure, and in contrast to the large electrolysis installations for the production of detonating gas it is only possible to omit the conventional diaphragm for the gas separation.

SUMMARY OF THE INVENTION

Hence, it is a primary object of the present invention to provide a multi-cell electrolysis apparatus for producing detonating gas, i.e. a water decomposition apparatus for generating detonating gas or oxyhydrogen gas, which for economical reasons should possess a number of successively bounding electrolysis or electrolytic cells.

According to the invention the water decomposition apparatus of this development is manifested by the features that the cells are constructed as vessels which are open at the top and at the upper portion open into a common compartment at different elevational heights, and which common compartment surrounds such cells. Further, the cell with the highest situated mouth flow communicates via an opening in its floor or bottom with the lower portion of the aforesaid compartment.

According to a particularly advantageous constructional embodiment of the invention the electrodes, with the exception of at least a first electrode and a last terminal electrode, are provided in each case between each two successively bounding cels as partition walls between the relevant cell compartments or chambers, and wherein the upper mouths of the cells are formed by the upper edges of the electrodes. The electrodes are advantageously embedded in a common housing formed of insulating material and which housing is open at the top. These electrodes can be constructed as plate electrodes.

A further possibility resides in the features of constructing the electrodes of cylindrical-shape and arranging the same coaxially, the supporting housing for the electrodes likewise can possess a substantially circular-shaped cross-section, and the cell with the higher situated mouth should be arranged at the center. With this embodiment the radial spacing between the electrodes advantageously decreases towards the outside.

A further objective of the present invention aims at the provision of an automatic level regulation of the electrolyte level in the aforementioned compartment, i.e. in the leaching tank or vat, without being required to use electrical probes or sight glasses or the like.

This objective of the invention is realized in that the compartment, in particular the leaching vat, flow communicates with a compensation or balancing tank, and a gas discharge opening of the leaching tank is equipped with a discharge or outlet valve.

This allows for an automatic and simple regulation of the level of the electrolyte. The electrical probes which are oftentimes employed for such level regulation cannot be used in conjunction with equipment for producing detonating gas, since even the slightest sparks could ignite the highly explosive detonating gas. Furthermore, the conventional sighting or inspection glasses are associated with the drawback that they can rupture, or can become unusable due to the deposition of material at the inside of the glass.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a schematic sectional view of the lower portion of the cell communicating with the electrolyte;

FIG. 4 illustrates a further variant of the arrangement of the electrolytic cells;

FIG. 5 is a sectional detail of a variant of the equipment depicted in FIG. 1 employing a cooling coil for the electrolyte; and FIG. 6 schematically illustrates a multi-cell electrolysis apparatus as contemplated by the invention and equipped with mechanism for regulating the height of the level of the electrolyte in the leaching tank and portraying at the right-hand side thereof the associated working or function diagram.

DETAILED DESCRIPTION OF THE PREFERRED EMBODIMENTS

Figure 1:
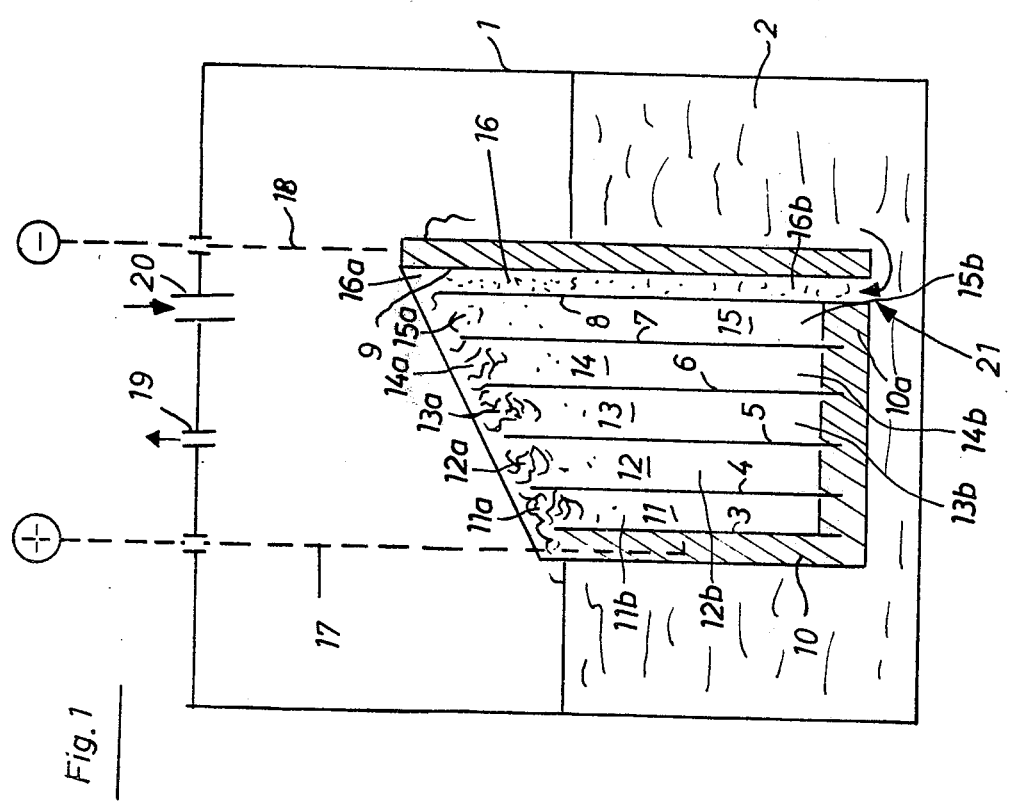
FIG. 1 schematically illustrates a first embodiment of water decomposition apparatus designed according to the teachings of the present invention.

Describing now the drawings, FIG. 1 illustrates purely schematically the principal construction of a water decomposition apparatus as contemplated by the invention, i.e. a multi-cell electrolysis apparatus for producing detonating gas by the conventional electrolysis of water.

The apparatus under discussion will be seen to comprise a leaching tank or vat 1 which contains a certain quantity of electrolyte 2. In the tank 1 there are arranged the electrodes 3, 4, 5, 6, 7, 8 and 9, and in the illustrated exemplary embodiment such electrodes 3–9 are constructed as plate electrodes.

The individual electrodes 3–9 are supported in a housing 10 which is open at the top, housing 10 being formed of an insulating material, for instance hard rubber, plastic or an equivalent material. Between the plate electrodes 3–9 there are formed so-called electrolysis or electrolytic cells 11, 12, 13, 14, 15 and 16, these cells being open at the top. Both of the outermost electrodes 3 and 9 respectively are electrically coupled to both terminals of a suitable source of electrical energy, namely a direct-current source or direct-current voltage source, which has been schematically portrayed in FIG. 1 by the positive and negative terminals. The electrical conductors or lines 17 and 18 leading from the positive and negative terminals of the direct-current voltage source extend from above through the not particularly referenced cover of the leaching tank or vat 1 and while insulated from the electrolyte 2 arrive at the electrodes.

Additionally, at the cover of the leaching tank 1 there are provided a gas outlet or discharge 19 as well as a filling or infeed stud or connection 20 for electrolyte. This infeed stud of connection 20 is located above the highest situated cell 15 which does not directly flow communicate with the contents of the tank 1 i.e. the electrolyte vat 2.

A particular aspect of the construction of equipment depicted in FIG. 1 resides in the design of the electrolysis cells. As already mentioned the cells 11–16 are open at the upper end or top and open into the tank 1. The free mouths or openings 11a–16a at the different cells 11–16 respectively, are located at different elevational positions or levels. It will be recognized that the cell 16 prossesses the greatest height, and the height, that is to say the mouth 16a of this cell 16 is defined by the upper edges of the plate electrodes 8, 9 which delimit or bound such cell. The neighboring cell 15 possesses a somewhat smaller height, determined by the upper edge of the plate electrode 7, the cell 14 a still smaller height than the cell 15 and so forth, and wherein it should be recognized that the reduction in the height from one cell to the next, as illustrated, occurs in a step-like fashion.

The highest cell 16 flow communicates through the agency of one or more openings 21 at the floor or bottom 10a with the tank 1, so that this cell 16 is automatically supplied with electrolyte from the tank 1.

The remaining cells 11–15 are initially filled and during the operation, i.e. during the electrolysis process, the foam which forms is delivered from the cell 16 and the other cells to the neighboring lower situated cells and hence there is guaranteed for a faultless operation of the entire equipment. The upper lateral boundary of the insulating housing 10 must be situated at a greater elevation than the level of the individual compartments or chambers 11b, 12b, 13b, 14b, 15b, 16b of the cells 11–16 respectively, in order that the electrolyte foam which is present in each such compartment is forced to move into the neighboring lower compartment and not directly into the electrolyte bath 2. The lowest compartment 11b must possess an overflow in order that the electrolyte foam can again finally flow into the bath 2. Any damming-up would otherwise cause the cell 11 to overflow the cell 12 and so forth with the liquid electrolyte and to render such inoperable. It is not possible for one of the cells to "dry-up", since an infeed of electrolyte at least in the form of foam is always present. Since as is well known an electrolyte in a foam state possesses a lower electrical conductivity value than a liquid electrolyte, owing to the presence of the foam-like electrolyte there are only produced slightly stray currents. Consequently, optimum operating conditions always prevail.

As already mentioned the cells 11–15 are filled with electrolyte, and specifically via the supply or infeed connection 20 which is located over the next highest situated cell 15.

Figure 2:
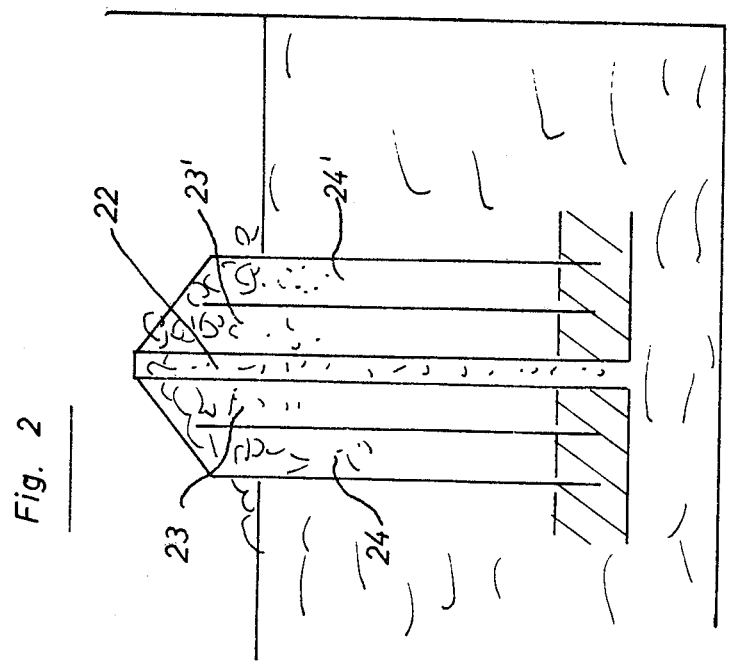
FIG. 2 schematically illustrates a variant embodiment of electrolysis cells for the equipment according to FIG. 1.

FIG. 2 of the drawing illustrates a variant arrangement of cells, wherein to both sides of a central cell 22 there are arranged further cells 23, 23' at the same elevational difference with respect to the central cell 22, then the cells 24, 24' and so forth. With such constructional embodiment there is obtained in comparison to the equipment shown in FIG. 1 twice the number of cells for the same elevational difference and therefore a better utilization of the height of the leaching compartment.

FIG. 3 shows an advantageous construction of the lower portion of the highest cell, the so-called "foam pump cell". The cell 25 communicates through the floor opening 26 in the housing 27 with the electrolyte bath 28 in the leaching tank. Owing to the illustrated supplementary openings 29 there is ensured for a particularly good afterflow of electrolyte, i.e. the lower portion of the cell 25 always possesses good electrically conductive characteristics, resulting in the fact that also with high output by the "foam pump cell" 25 there does not occur any appreciable current limiting. The electrode spacing $e$ of the foam pump cell 25 is made sufficiently small, so that the gas which is formed in the cell 25 during upward bubbling entrains sufficient liquid electrolyte, foams the same and there is developed the desired foam pump action.

FIG. 4 illustrates substantially cylindrically arranged electrolytic cells, wherein apart from the cell 30 which communicates with the electrolytic bath there are further provided the concentric cells 31, 32 and 33. It is further to be mentioned that owing to the increasing throughpassage surface for the electrolyte the radial electrode spacing, as designated by reference characters, $e_1$, $e_2$ and $e_3$, can become smaller towards the outside.

FIG. 5 illustrates an electrolysis apparatus wherein the electrolyte foam-pump cell 34 is used for cooling purposes as the circulation pump for the electrolyte. In this arrangement the connection between the cell 34 and the electrolytic bath 35 occurs via a conduit 36 in which there is installed a cooling coil 37, which may be an air- or water-cooled cooling coil. If necessary, or advantageous, cool air can be blown against the cooling coil 37.

FIG. 6 illustrates an electrolysis apparatus equipped with a leaching tank or vat 38, a plurality of electrodes 39, and an automatically functioning regulation mechanism 40 for regulating the level or height of the electrolyte in the tank.

The electrodes 39 are conventionally constructed as plate electrodes and connected via appropriate electrical conductors or lines 41 and 42 with the direct-current voltage source (not schematically shown), but may be like the voltage source discussed previously in conjunction with the description of the embodiment of FIG. 1. Since cells which are flooded by the electrolyte are not operational, it is particularly important to regulate the height of the electrolyte level $h$ in the tank 38.

For reasons of operational safety it is particularly undesirable when producing detonating gas to use electrical probes or sighting glasses as the level control.

The regulation can occur automatically by means of the illustrated mechanism. The tank 38 is sealingly closed and equipped with a pressure resistant, closable electrolyte infeed connection or stud 43. Furthermore, there is provided a gas discharge conduit or pipe 44 equipped with a gas outlet valve 45. A compensation or balancing tank (compensation vessel) 46 is arranged adjacent the leaching tank or vat 38, both of the tanks flow communicating with one another via the conduit or pipe 47. This conduit contains a valve 48.

The supply voltage $U_{sp}$ is dependent upon the number of functioning electrodes i.e. electrolysis cells (those cells which are flooded with electrolyte do not function), that is to say, upon the level $h$ of the electrolyte in the tank 38.

From the working or function diagram shown at the right-hand side of FIG. 6 it will be apparent that with maximum supply voltage $U_{sp}$ the valve 45 ($V_1$) opens in order to expel gas. However, at the same time the electrolyte compensation valve 48 ($V_2$) closes. The installation can function in the normal manner.

During an initial filling of the tank 38 with electrolyte the electrolyte $h$ in the tank can be greater than the lowest cell so that such is flooded. Consequently, the supply voltage which is effective at the electrodes is however placed under load and with appropriately selected source resistance of the supply voltage source such assumes a lower value which approximately corresponds to the number of non-flooded cells (i.e. functional cells) multiplied by the characteristic electrolysis voltage of one individual cell. Valve 45 ($V_1$) remains closed and valve 48 ($V_2$) is open. The gas appearing from the functional cells cannot escape and therefore expresses the electrolyte via the conduit 47 into the compensation or balancing tank 46. Consequently, flooded cells are normalized, the voltage increases approximately in a stepwise manner until there is reached the full voltage. Now the valve 45 ($V_1$) opens and the valve 48 ($V_2$) closes. The electrolyte in the compensation tank 46 which is exposed to the gas pressure no longer can flow back and flood the cells. The gas generator therefore has now attained its normal complete function.

If the gas generator is placed out of operation then the valve 48 ($V_2$) opens the valve 45 ($V_1$) closes. Since valves never provide a complete 100% seal gas will progressively escape from the tank 38 and electrolyte will flow back from the compensation tank 46 into the tank 38 and thus replenish the consumed electrolyte.

The level $a$ of the opening of the conduit 47 into the tank 38 is advantageously designed to be slightly less than the level of the lowest electrolysis cell. Consequently, even in the presence of a possible defect in the electrical valve control there is prevented that more than the required quantity of electrolyte can be forced into the compensation tank.

The positioning of the valve control can occur through the agency of optical indicator lamps or equivalent structure and therefore indicates whether the total quantity of electrolyte has fallen below the "overflow of flooding level".

While there is shown and described present preferred embodiments of the invention, it is to be distinctly understood that the invention is not limited thereto but may be otherwise variously embodied and practiced within the scope of the following claims. Accordingly,

What is claimed is:

1. A water decomposition apparatus for producing detonating gas, comprising a plurality of electrolysis cells open at the top and provided with electrodes, each cell being equipped at the top thereof with a mouth located at different elevations and communicating with the next adjacent lower situated cell to permit the flow of liquid therein contained from one to the next, a common housing for said electrodes formed of insulating material, open at the top, and containing said electrodes, and a tank defining a further compartment for receiving said common housing and said electrodes, said further compartment containing an electrolyte, the highest cell with the highest situated mouth communicating with a lower portion of said further compartment by means of an opening provided in the floor of said highest cell.

2. The water decomposition apparatus as defined in claim 1, wherein said electrodes possess a substantially cylindrical configuration and are substantially coaxially arranged, said housing having a substantially circular-shaped cross-sectional shape when viewed in a substantially horizontal plane, the cell having the highest situated mouth being located at the center of such electrode arrangement.

3. The water decomposition apparatus as defined in claim 2, wherein the radial spacing between the electrodes decreases towards the outside.

* * * * *